United States Patent [19]
Schiller et al.

[11] 3,935,157
[45] Jan. 27, 1976

[54] POLYCARBONATE RESIN HAVING IMPROVED ELECTRICAL TRACKING RESISTANCE

[75] Inventors: Paul Schiller, Krefeld; Hugo Vernaleken, Krefeld-Uerdingen, both of Germany

[73] Assignee: Bayer Aktiengesellschaft, Leverkusen Bayerwerk, Germany

[22] Filed: Mar. 28, 1974

[21] Appl. No.: 455,842

[30] Foreign Application Priority Data
Sept. 11, 1973 Germany............................ 2345799

[52] U.S. Cl.... 260/37 PC; 174/137 B; 260/45.75 R; 260/45.75 N; 260/45.75 C; 428/412
[51] Int. Cl.²............................................ C08J 3/20
[58] Field of Search........ 260/45.75, 47 XA, 37 PC; 117/138, 138.8 F, 161, 132 C; 428/412; 174/137 B

[56] References Cited
UNITED STATES PATENTS

| | | |
|---|---|---|
| 3,148,172 | 9/1964 | Fox........................................ 260/37 |
| 3,418,066 | 12/1968 | Caldwell et al........................ 260/47 |
| 3,492,268 | 1/1970 | Baker..................................... 260/47 |
| 3,577,346 | 5/1971 | McKeown.......................... 260/45.75 |
| 3,817,907 | 6/1974 | Muller et al.......................... 260/37 |
| 3,817,911 | 6/1974 | Taylor.................................... 260/37 |

OTHER PUBLICATIONS

Polycarbonates — Christopher & Fox. Reinhold Pub. Co., N.Y.C., 1962 pp. 151 and 152.

*Primary Examiner*—V. P. Hoke
*Attorney, Agent, or Firm*—Lawrence S. Pope; Gene Harsh

[57] ABSTRACT

A polycarbonate plastic having improved electrical tracking resistance is provided by including in the polycarbonate a substance which is normally an oxidation or combustion catalyst such as a transition metal having a positive oxidation potential of >+0.2 volt.

5 Claims, No Drawings

POLYCARBONATE RESIN HAVING IMPROVED ELECTRICAL TRACKING RESISTANCE

This invention relates generally to high-molecular weight thermoplastic polycarbonates prepared from aromatic bis-hydroxy compounds and more particularly to such polycarbonates having improved electrical tracking resistance and to the use of these improved polycarbonates for the production of electrical insulating components for electrical engineering purposes.

The resistance of a synthetic polymer to (surface) leakage current is becoming more and more important when selecting a polymer for use in the electrical field, and particularly for use in the production of kitchen appliances and refrigerators, deep-freeze chests, clothes washing machines and dishwashing machines. In addition to suitable mechanical and thermal properties, the polymer used for these purposes must have good resistance to leakage current and particularly to surface leakage current since such appliances frequently become wet on the surface and in this way (surface) leakage currents may form between the voltage-conducting parts. It is therefore important that synthetic substances used for making electrical appliances possess as good an electrical tracking resistance as possible to (surface) leakage electrical current. The heretofore available high-molecular weight thermoplastic polycarbonates based on aromatic dihydroxy compounds have good physical and thermal properties but possess little resistant to (surface) leakage current.

It is therefore an object of the invention to improve the resistance of a polycarbonate plastic to leakage current. Another object of the invention is to provide a process for making a polycarbonate having improved electrical properties. Another object of the invention is to provide a polycarbonate prepared from an aromatic bis-hydroxyaryl compound and having improved resistance to surface current leakage properties. Still another object of the invention is to provide a polycarbonate having improved electrical insulation properties which is useful for making electrical insulating components.

The foregoing objects and others are accomplished in accordance with this invention, generally speaking, by providing a thermoplastic polycarbonate prepared from a bis-hydroxyaryl compound and phosgene or a diester of carbonic acid and containing a metal or oxide thereof which is normally an oxidation or combustion catalyst. It has now been found that the electrical tracking resistance of high-molecular weight thermoplastic polycarbonates based on aromatic bis-hydroxyaryl compounds can be improved significantly by the addition of an oxidation and/or combustion catalyst to the polycarbonate, preferably, in an amount of 0.05% to 10% by weight with respect to the weight of the polycarbonate. The resistance to leakage current of any of the heretofore available polycarbonates produced by such processes can be improved by incorporating therein one or more of the metal or metal oxides described herein so the invention does not contemplate any particular method of reacting the bis-hydroxyaryl compound with phosgene or a diester of carbonic acid to form the polycarbonate, but, on the other hand, contemplates a process of improving the resistance to leakage current of all such polycarbonates and to the improved polycarbonates.

The invention thus provides high-molecular weight thermoplastic polycarbonates based on aromatic bis-hydroxy compounds with a content of a substance which is known per se as an oxidation catalyst and/or combustion catalyst in amounts of about 0.05% to about 10% by weight, preferably in amounts of 0.1% to 3% by weight, with respect to the weight of the polycarbonate.

Polycarbonates containing such oxidation and/or combustion catalysts to improve the resistance thereof to (surface) leakage electric current have not been described heretofore in the literature.

Any suitable oxidation or combustion catalyst may be used. Such catalysts are metals, chiefly transition metals or their oxides, which are especially readily subject to a valency change and which possess a positive oxidation potential of $>+0.2$ volt (for the definition of the oxidation potential see: H. Remy, Lehrbuch der anorganischen Chemie, Vol. I, p. 899, Leipzig 1960; for the term oxidation catalysts see: Handbuch der Katalyse B IV Heterogene Katalyse, I, p. 384, Vienna, Springer-Verlag 1943 and B. N. Dolgow, die Katalyse in der organischen Chemie, p. 165, VEB Deutscher Verlag der Wissenschaften, Berlin 1963, all of which are incorporated herein by reference thereto).

The metals or transition metals and their oxides from the Groups I B, III A, V A – VI A and VIII of the Periodic System of the Elements (cf. J. Eggert, Lehrbuch der physikalischen Chemie, 8th Edition, S. Hirzel Verlag Stuttgart, 1960, page 101, enclosed) are examples of suitable catalysts. Especially preferred catalysts are vanadium, molybdenum, copper, silver, platinum, palladium, cobalt, nickel, cerium and the oxides thereof. Any of these elements having the properties described above may be used in accordance with this invention to improve the electrical insulating properties of a polycarbonate. They may be used in the form of the pure metals or of the oxides, alone or in admixture.

The oxidation catalysts and/or combustion catalysts to be used may also be deposited in known manner on a carrier material and added together with the carrier to the polycarbonate.

Suitable carrier materials for oxidation catalysts are described in the literature, for example, in "Handbuch der Katalyse Vol. IV, Heterogene Katalyse I, p. 137 ff., Vienna 1943, Springer-Verlag," the disclosure of which is incorporated herein by reference.

Particularly suitable carrier materials are $SiO_2$, $Al_2O_3$ (highly calcined), $ZnO$, $TiO_2$, $Cr_2O_3$, $BaSO_4$, $BaCO_3$ and $CdS$. The carrier materials may be used in proportions of from 1:1 to 1:100 (catalyst:carrier). Preferred combinations of effective oxidation and/or combustion catalysts with carrier materials are noble metals such as Ag, Pt and Pd and copper or their oxides deposited on $Al_2O_3$, $ZnO$, $SiO_2$ or $TiO_2$.

It is to be noted that the addition of these carrier materials, without the oxidation catalysts and/or combustion catalysts, in the amounts mentioned above are suitable not in every case for the purpose of the instant invention; some of these carrier materials, used alone, are even unsuitable for the purpose of the invention; some of these carrier materials, especially $TiO_2$ or $Cr_2O_3$, are suitable for the purpose of the invention, if they are used, without the oxidation catalysts and/or combustion catalysts, in amounts between 10% by weight and 50% by weight, based on the total weight of the polycarbonate composition.

The electrical current leakage resistance of any high-molecular weight thermoplastic polycarbonate which is a polycondensate obtained by reaction of an aromatic bis-hydroxy compound, particularly a dihydroxydiarylalkane, with phosgene or a diester of carbonic acid can be improved in accordance with this invention. Suitable polycarbonates may be prepared from unsubstituted dihydroxydiarylalkanes or dihydroxydiarylalkanes having aryl radicals which carry in the ortho and/or the meta-position to the hydroxyl group methyl groups or halogen atoms. Branched polycarbonates are also suitable.

The polycarbonates may have an average molecular weight between about 10,000 and 100,000, preferably between about 20,000 and about 40,000.

Any suitable aromatic bis-hydroxy compound may be used in making the polycarbonate, e.g. hydroquinone, resorcinol, 4,4'-dihydroxydiphenyl, bis-(hydroxyphenyl)-alkanes such as for example, $C_1$–$C_8$-alkylene- or $C_2$–$C_8$-alkylidene-bisphenols, bis(hydroxyphenyl)-cycloalkanes such as for example $C_5$–$C_{15}$-cycloalkylidene-bisphenols, bis-(hydroxyphenyl)-sulphides, bis-(hydroxy-phenyl)-ethers, bis-(hydroxy-phenyl)-ketones, bis-(hydroxy-phenyl)-sulphoxides, bis-(hydroxy-phenyl)-sulphones and the like. Additionally, $\alpha,\alpha'$-bis-(hydroxyphenyl)-diisopropylbenzene as well as the corresponding nuclearly alkylated or nuclearly halogenated compounds may be used. Polycarbonates based on bis-(4-hydroxy-phenyl)-propane-2,2 (bisphenol A), bis(4-hydroxy-3,5-dichloro-phenyl)-propane-2,2 (tetrachlorobisphenol A), bis-(4-hydroxy-3,5-dibromo-phenyl)-propane-2,2 (tetrabromobisphenol A), bis-(4-hydroxy-3,5-dimethylphenyl)-propane-2,2 (tetramethylbisphenol A), bis-(4-hydroxyphenyl)-cyclohexane-1,1 (bisphenol Z) and based on trinuclear bisphenols such as $\alpha,\alpha'$-bis-(4-hydroxyphenyl)-p-diisopropylbenzene are preferred.

Additional bisphenols which are suitable for the preparation of polycarbonates to be improved in accordance with this invention are disclosed in U.S. Pat. Nos. 3,028,365; 2,999,835; 3,148,172; 3,271,368; 2,970,137; 2,991,273; 3,271,367; 3,280,078; 3,014,891; 2,999,846; the disclosures of which are incorporated herein by reference.

The oxidation or combustion catalysts may be added to the polycarbonate in any suitable manner such as by the following processes:

1. By addition of the oxidation or combustion catalyst—optionally as master batch — to the polycarbonate melt.
2. By incorporation of the oxidation or combustion catalyst in a solution of the polycarbonate and subsequent evaporation of the solvent and drying.

The polycarbonates so prepared are used in the electrical field, particularly for the production of voltage-conducting or electrically insulating components such as circuit switching elements, electric plugs, sockets and the like where good mechanical and, above all, good thermal properties are necessary.

Pigments, ultra-violet stabilizers and internal lubricants may also be admixed with the polycarbonates according to the invention.

The following Examples shown in tabular form illustrate resistance to (surface) leakage current of the polycarbonates according to the invention.

EXAMPLE 1

A polycarbonate prepared by reacting 2,2-bis-(4-hydroxyphenyl)-propane with phosgene by a conventional interface process having a relative viscosity of 1.300 (measured in methylene chloride at 25°C with $c = 5$ g/l) is mixed with the desired amount of very finely ground oxidation catalyst indicated in Table I and optionally with pigment and injection molded to give sheets 5 mm thick. On these test bodies the resistance to (surface) leakage current is measured according to the KC process (VDE (Verband Deutscher Elektrotechniker, i.e., Association of German Electrical Engineers) Instruction Sheet 0303, Part 1, of September, 1964 respectively DIN 53 480, section 6 of October 1972). The values found are listed in the following Table I.

TABLE I

| Oxidation Catalyst | % by weight of addition | Tracking Resistance to (surface) leakage current according to the KC process in volts |
|---|---|---|
| $V_2O_5$ | 0.2 | 320 |
| $V_2O_5$ | 2.0 | 340 |
| $MoO_3$ | 0.5 | 300 |
| $MoO_3$ | 2 | 340 |
| $CeO_2$ | 0.2 | 280 |
| $CeO_2$ | 0.5 | 340 |
| $TiO_2$; $V_2O_5$ 9:1 parts by weight | 5 | 340 |
| $TiO_2$; $CeO_2$ 9:1 parts by weight | 5 | 340 |
| Ag. 3 ZnO | 2 | 380 |
| Mixed Catalyst $V_2O_5$; $TiO_2$; $Cr_2O_3$ 1:3:1 parts by weight | 5 | 380 |
| Mixed Catalyst Ni, NiO, $Cr_2O_3$, $Al_2O_3$ 1:1:1:5:1 | 0.5 | 340 |
| $V_2O_5$; $P_2O_5$; CuO 2:2:1 parts by weight | 2 | 320 |
| Polycarbonate without addition | | 260 |
| Polycarbonate with 20% by weight fiberglass without oxidation catalyst | | 160–180 |
| Polycarbonate with 20% by weight fiberglass, $Al_2O_3$ Pt 19:1 parts by weight | 1 | 320 |

EXAMPLE 2

Using the procedures described in Example 1, the following polycarbonates are prepared:

2a. Copolycarbonate based on 94 mol-%, 2,2-bis-(4-hydroxyphenyl)-propane and 6 mol-% 2,2-bis-(4-hydroxy-3,5-dichlorophenyl)-propane, $\eta_{rel} = 1.287$.

2b. Copolycarbonate based on 96 mol-% 2,2-bis-(4-hydroxyphenyl)-propane and 4 mol-% 2,2-bis-(4-hydroxyphenyl)-3,5-dibromophenyl)-propane, $\eta_{rel} = 1.268$.

2c. Polycarbonate based on 4,4'-dihydroxydiphenylmethane, $\eta_{rel} = 1.293$, and the oxidation catalysts stated in Table II are incorporated therein, processed into test bodies and tested for resistance to (surface) leakage current (KC process).

TABLE II

| Polycarbonate according to Example | Oxidation Catalyst | Amount [% by weight] | Tracking Resistance to (surface) leakage current [volts] |
|---|---|---|---|
| 2a | — | — | 240–260 |
|  | $V_2O_5$ | 0.5 | 340 |
| 2b | — | — | 240 |
|  | $MoO_3$ | 2.0 | 320 |
| 2c | — | — | 220–240 |
|  | $V_2O_5$ | 1.0 | 300 |

Any of the other oxidation or combustion catalysts disclosed as suitable herein may be substituted for those used in the foregoing examples for the purpose of illustration.

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. An electrical insulator having a minimum tracking resistance to leakage current of about 280 volts comprising an intimate blend of a high molecular weight thermoplastic polycarbonate based on an aromatic bis-hydroxy compound and 0.05% to 10% by weight of additives selected from the group consisting of oxides of vanadium, molybdenum, cerium, palladium, copper, silver, cobalt, nickel, and platinum.

2. An electrical insulator having a minimum tracking resistance to leakage current of about 300 volts comprising an intimate blend of a high molecular weight polycarbonate thermoplastic polycarbonate based on an aromatic bis-hydroxy compound and 0.05% to 10% by weight of additives selected from the group consisting of oxides of vanadium, molybdenum, palladium, copper, silver, cobalt, nickel, and platinum.

3. The insulator of claim 2 wherein the polycarbonate contains 0.1 to 3 percent by weight of additive based on the weight of polycarbonate.

4. The insulator of claim 2 wherein the additive is deposited on a carrier material which is blended with the polycarbonate.

5. The insulator of claim 2 wherein the polycarbonate has a molecular weight of between about 20,000 and 40,000.

* * * * *